United States Patent
Eames et al.

[11] Patent Number: 5,850,400
[45] Date of Patent: Dec. 15, 1998

[54] SYSTEM, METHOD, AND APPARATUS FOR BIDIRECTIONAL TRANSPORT OF DIGITAL DATA BETWEEN A DIGITAL NETWORK AND A PLURALITY OF DEVICES

[75] Inventors: Thomas R. Eames, Santa Rosa; Kenneth M. Buckland, Rohnert Park; Lac X. Trinh, Petaluma; Steven D. Warwick, Santa Rosa, all of Calif.

[73] Assignee: Next Level Communications, Rohnert Park, Calif.

[21] Appl. No.: 430,730

[22] Filed: Apr. 27, 1995

[51] Int. Cl.⁶ ........................................... H04J 3/00
[52] U.S. Cl. .................. 370/443; 370/458; 370/463; 370/395
[58] Field of Search .......................... 455/3.1, 5.1; 348/6, 348/7, 10, 12; 340/825.08; 370/329, 341, 346, 347, 348, 349, 395, 396, 401, 443, 449, 458, 463; 359/135, 136

[56] References Cited

U.S. PATENT DOCUMENTS

| | | |
|---|---|---|
| 4,994,909 | 2/1991 | Graves et al. ............................ 348/7 |
| 5,132,680 | 7/1992 | Tezuka et al. ........................ 370/85.8 |
| 5,150,247 | 9/1992 | Sharpe et al. ........................... 359/135 |
| 5,166,675 | 11/1992 | Amemiya et al. ..................... 370/85.8 |
| 5,361,091 | 11/1994 | Hoarty et al. ............................ 455/5.1 |
| 5,361,394 | 11/1994 | Shigihara ................................ 455/5.1 |
| 5,363,433 | 11/1994 | Isono ..................................... 370/94.1 |
| 5,367,517 | 11/1994 | Cidon et al. ........................... 370/85.8 |
| 5,421,030 | 5/1995 | Baran ....................................... 455/5.1 |
| 5,425,027 | 6/1995 | Baran .................................... 370/85.8 |
| 5,457,560 | 10/1995 | Sharpe et al. .......................... 359/137 |

Primary Examiner—Chi H. Pham
Assistant Examiner—Ricky Ngo
Attorney, Agent, or Firm—J.P. Blasko Professional Corp.; Charles A. Eldering; John B. Blasko

[57] ABSTRACT

Digital data is transported bidirectionally between a broadband network unit and devices. The data is transmitted in a series of frame intervals that include request slots and cell slots for transmission of ATM data. The request slots may be used by a device to request one or more cell slots. The broadband network unit determines which requests to grant. If the request is granted, the device may use the cell slot to transmit ATM data. In addition, the request slot can accommodate Time Division Multiplex data such as digital telephony.

48 Claims, 9 Drawing Sheets

SYSTEM, METHOD, AND APPARATUS FOR BIDIRECTIONAL TRANSPORT OF DIGITAL DATA BETWEEN A DIGITAL NETWORK AND A PLURALITY OF DEVICES

TECHNICAL FIELD

This invention relates to the bi-directional transport of digital data between a digital network and devices in customer premises, such as a residence or business, and more specifically, to the management of concurrent accesses to the transport medium by multiple devices in the customer premises, so that the devices can share the data transport medium without corruption of the data being transported.

BACKGROUND

An important problem that must be solved in a bi-directional transport system between a digital network and devices in customer premises is the management of contention between a number of devices in the customer premises so that they can all access the shared media, generally, coaxial cable media. That is, all of the devices in each customer premise are directly attached to the same coaxial cable, and all of these devices seek to transmit signals to the digital network. As a result, some method is required of determining which device should transmit on to the cable at any given time. In the absence of such a method, a number of devices could transmit simultaneously, resulting in the corruption of all of their signals. Methods that address this problem of contention are termed media access control (MAC) methods.

At the present time a number of MAC methods exist for transporting digital services over coaxial cable. The majority of these approaches are designed to operate in the hybrid fiber-coax (HFC) topology, in which digital services are carried over the coaxial cable infrastructure that was installed for transmission of analog cable television services. This HFC topology requires that digital signals travel long distances between the digital network and the customer premises. Further, the HFC topology requires that all of the devices in many homes (often as many as 500) must all make use of the same shared coaxial media. The use of a single medium shared by multiple devices introduces the possibility that multiple devices will contending for access to the media at the same time. If not managed, this contention will result in multiple devices attempting to transport data on the medium at the same time, thereby corrupting the data and preventing its successful transmission. The large number of devices that share the media in an HFC configuration substantially increases the complexity of managing this contention, making such a configuration undesirable.

Another approach locates small digital concentrators or switches close to a small number of customer premises, where the digital signal is transferred to and from a high-bandwidth medium such as a fiber optic medium to coaxial cable. This approach is referred to as fiber-to-the-curb (FTTC) topology. These small digital concentrators or switches effectively move the boundary of the digital network much closer to each customer premise. The result is that a separate coaxial cable can be run to each premise so that contention for that media is restricted to the devices in a single premise. This difference, plus the shorter run of the coaxial cable itself, results in drastically different requirements for a FTTC MAC than for a HFC MAC.

Most currently available FTTC MACs are designed to transport ATM (asynchronous transport mode) cells to and from the customer premise. The transport of ATM cells is important, but the currently available MACs do not include any explicit means by which to carry TDM (time division multiplexed) signals, such as telephone signals. Existing MACs can carry TDM signals only by segmenting them into ATM cells and later reassembling them, or by carrying them over a parallel distribution system. This is an unwieldy approach that results in buffering, latency and synchronization problems.

It is therefore an object of the present invention to provide a media access control approach that is specifically suited to the "fiber-to-the-curb" coaxial cable distribution topology. It is a further object of the present invention to provide a media access control approach that is suited to the bi-directional transport of digital services over a coaxial cable to which many devices in the same customer premise are attached. It is a further object of the present invention to provide a media access control approach that is suited to the transport of TDM (time division multiplexed) signals that are transmitted at regular intervals and that require minimal delay.

SUMMARY OF THE INVENTION

Briefly, the invention provides for the bidirectional transportation of digital data between a digital network and devices in a customer's premises, and for further data transmission between the broadband network unit and a broadband digital terminal, and between the broadband digital terminal and a digital network, such as a synchronous optical network. A device including a network interface module exchanges data on a shared media such as a coaxial cable with the broadband network unit. Each network interface module thereby contributes a portion of an upstream signal to the broadband network unit. The upstream signal comprises of a series of frame intervals. A frame interval has a width that is a multiple of 125 microseconds. A frame interval has two major components; request slot packets and cell slot packets. Request slot packets are allocated one for each network interface module. There are an arbitrary number of cell slot packets. The request slot packets are capable of transporting requests for cell slots to the broadband network unit. The broadband network unit decodes the requests and determines which of the requests, if any, to grant. One way by which the broadband network unit may determine which of the request to grant is to create a number of ordered lists, each list containing a number of candidates for grant. An ordered list can be created for each discrete predetermined priority recognized by the broadband network unit. The broadband network unit may then select candidates from the list according to the predetermined priorities. The broadband network unit transports to the network interface modules a downstream signal that encodes the grant, by identifying which cell slots are allocated to which devices. Additionally, a request slot is capable of carrying periodic data such as Time Division Multiplex data.

BRIEF DESCRIPTION OF THE DRAWINGS

The present invention may be better understood, and its objects, features and advantages made apparent to those skilled in the art, by referencing the accompanying drawings in which.

DESCRIPTION OF SPECIFIC EMBODIMENTS

Topology and Signal Paths

Figure 1:
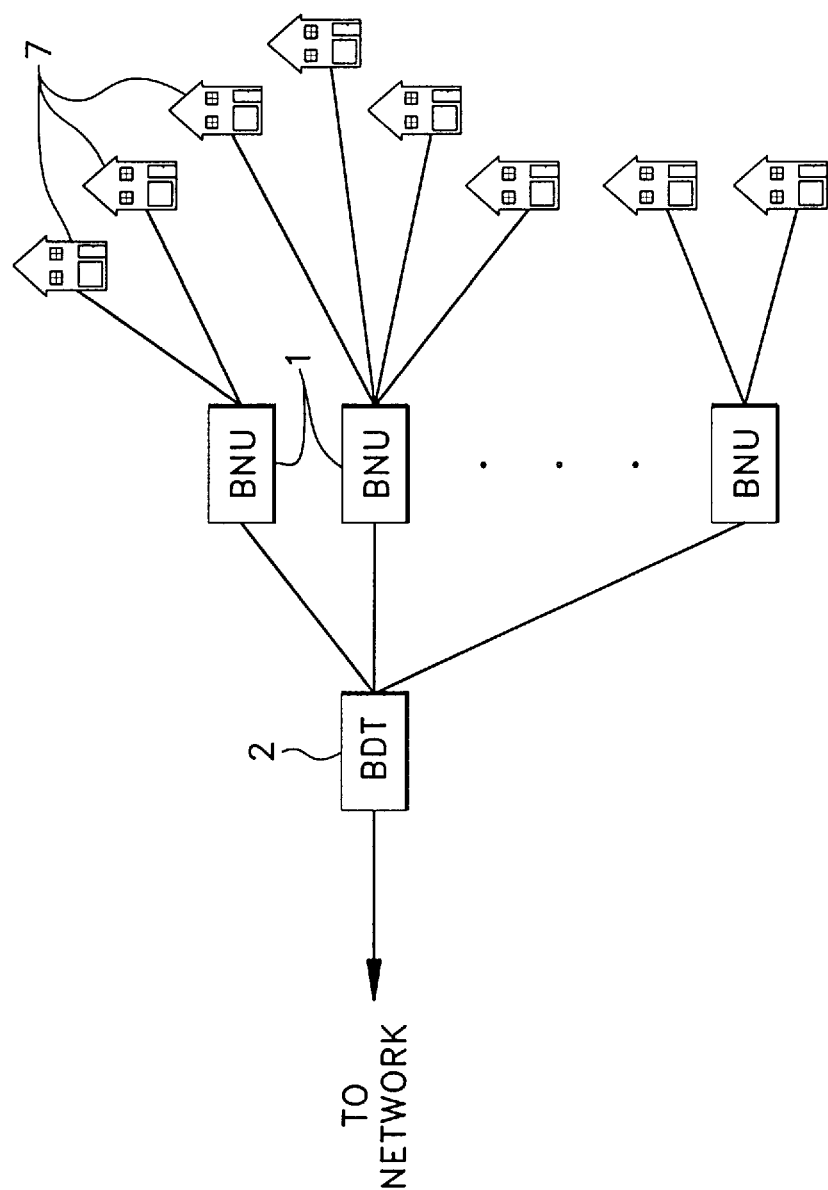
FIG. 1 depicts a system for the bidirectional transport of digital data communicating with a network.

FIG. 1 depicts a system for the bidirectional transport of digital data communicating with a network. A Broadband Digital Terminal (BDT) 2 is connected to a network such as a synchronous optical network (SONET). BDT 2 transmits and receives digital signals to and from the network, multiplexing the signals to a number of Broadband Network Units (BNUs) 1. Typically, a single BDT may service up to 64 BNUs. Each BNU 1 in turn is equipped with a number of ports. Each port is capable of servicing a customer premises 7 such as a residential home, though a medium such as coaxial cable 3. Typically, a BNU is equipped with 8 ports and can service 8 customer premises.

Figure 2:
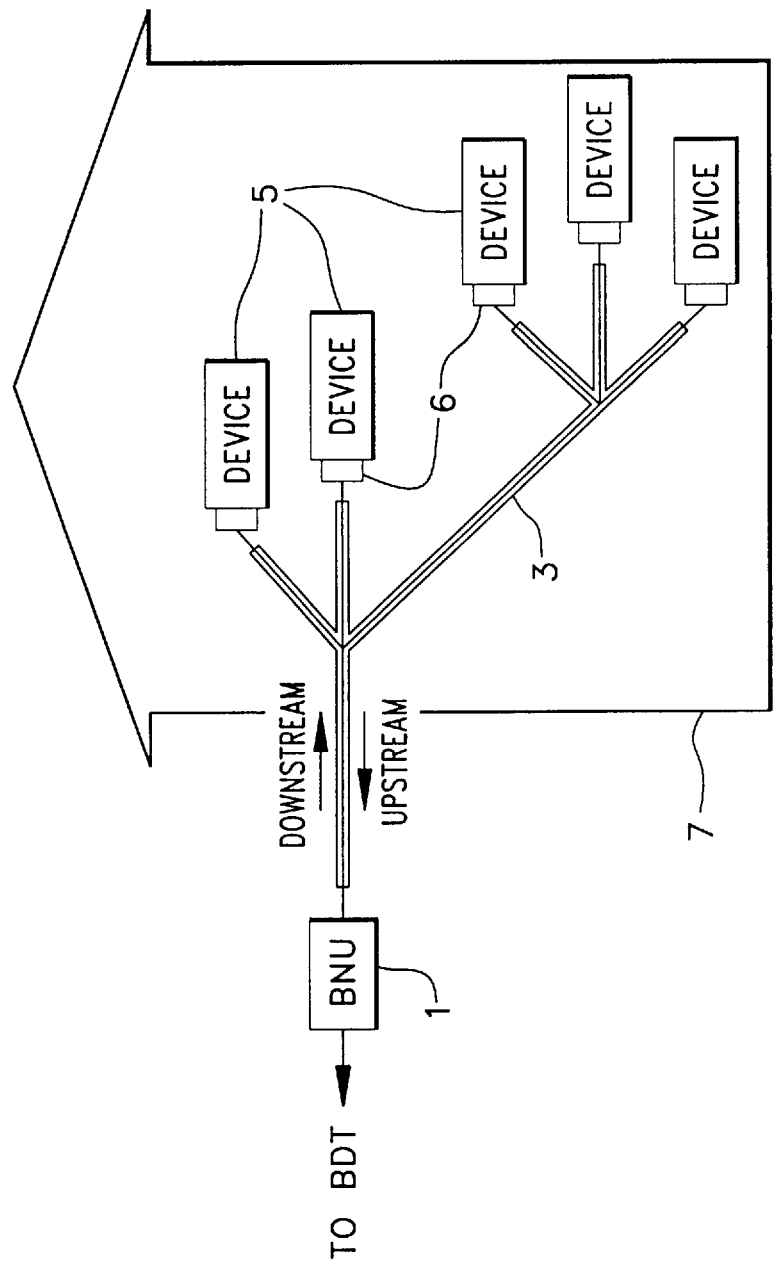
FIG. 2 depicts an example of a coaxial cable distribution topology using the apparatus in a customer premises.

FIG. 2 depicts an example of coaxial cable distribution topology into a customer premises 7. One or more devices 5 in customer premises 7 is connected to BNU 1 by means of coaxial cable 3. Examples of such devices include television set-tops, personal computers, digital telephones, burglar alarms, or any other device capable of transmitting or receiving digital data. A device 5 includes a Network Interface Module (NIM) 6, which is used to interface the device 5 with the connection to the BNU 1.

Each device 5 transmits directly onto the cable 3 in a bussed manner. All signals transmitted from each device on to the cable 3 are received by the BNU 1. Signals transmitted from a device 3 to the BNU 1 are referred to as "upstream" signals.

Each device 5 also receives signals from BNU 1 by means of the cable 3. All signals received by each device 5 are transmitted by the BNU 1. Signals transmitted from BNU 1 to one or more devices 5 are referred to as "downstream" signals. Downstream signals are, in effect, broadcast to each of the devices 5 by the BNU 1.

The transmission of the upstream and downstream signals are arranged in such a way that they do not interfere with each other. This can be done, for example, by placing them in different portions of the spectrum. The separation of the upstream and downstream allows signals to move in both directions simultaneously.

The MAC Upstream Format

Figure 3:
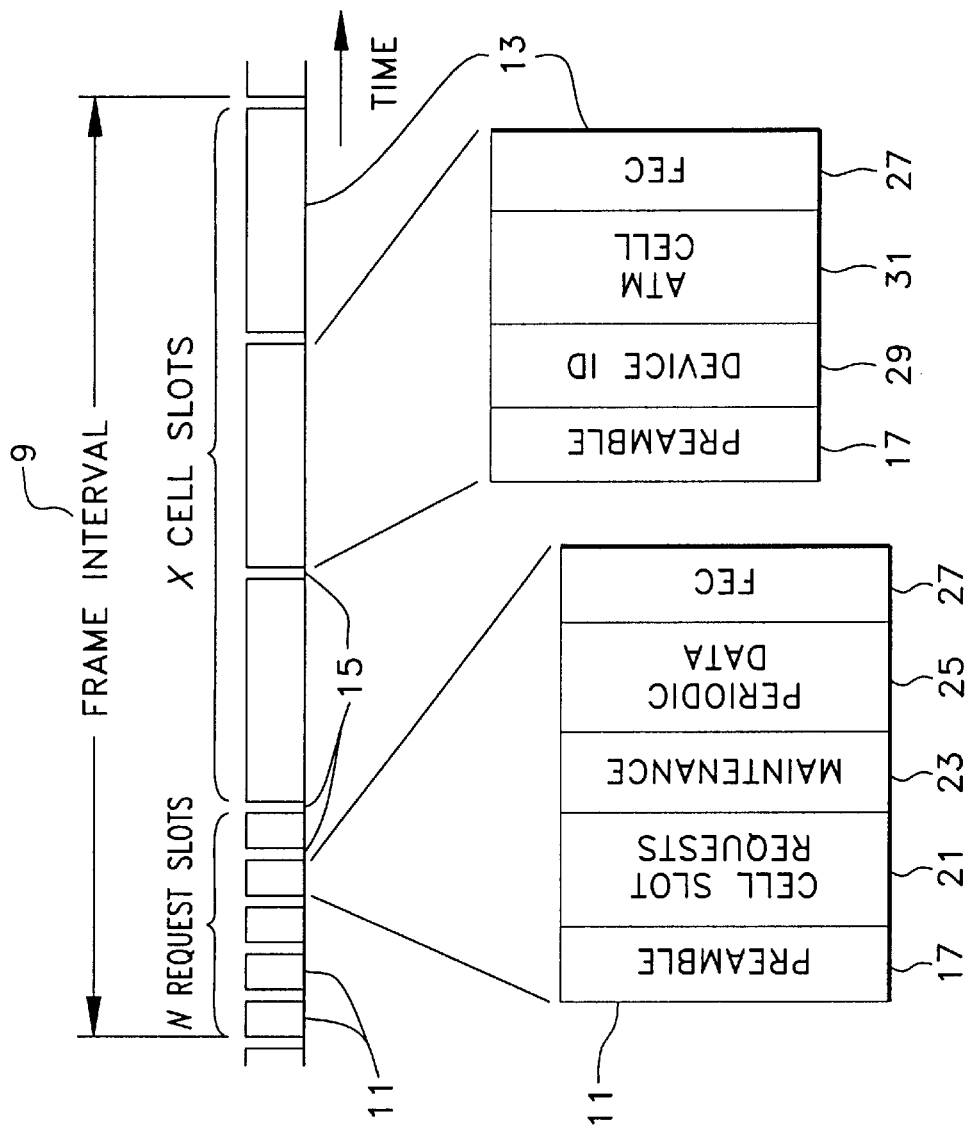
FIG. 3 depicts the format of an upstream signal.

FIG. 3 depicts the format of the upstream signal as used in the MAC. The upstream signal comprises a series of frame intervals 9 having a duration of time T. Each frame interval is segmented into two portions: a first portion containing a series of request slots 11 and a second portion containing a series of cell slots 13. In each frame interval, a request slot 11 is allocated for every device 5 being serviced by BNU 1 in customer premises 7. The number of request slots is variable and is determined according to the number of active devices in the premises. In each frame interval, a number of cell slots 13 are allocated. The number of cell slots is a fixed number X.

Each slot, regardless of whether it is a request slot or a cell slot, is separated from its adjacent slots by a guard time 15. The total time consumed by all request slots, all cell slots and all guard times in a given frame interval cannot exceed the frame interval duration T.

Request Slots

Each request slot 11 is always associated with a particular device 5. The request slots occur in a consistent order in each frame interval 9 so long as the number of devices 5 remains unchanged.

As shown in FIG. 3, a request slot 11 comprises five fields. These fields are the preamble 17; cell slot requests 21; maintenance words 23; periodic data words 25; and forward error correction (FEC) words 27. The preamble 17 provides synchronization, ande are used by the BNU receiver to lock on to each incoming request slot. The maintenance words 23 are employed by the BNU to control the transmission circuitry of each device. The maintenance words control maintenance functions such as error handling, diagnostics, and a datalink. FEC words 27 are used to provide error correction for the contents of the request slot 11 of which the FEC words are a part. In general the details of the preamble, maintenance words and FEC words provide support for, and are specific to, the modulation scheme employed for upstream transport, and the transmission environment in which it must operate. The modulation scheme and transmission environment are not pertinent to the present invention and are not further described.

The cell slot request words 21 provide information that describes requests made by each device 5 for access to one or more cell slots 13. Each request includes the priority of the request and the number of cell slots requested. The number of cell slots requested can be any number up to and including the total number X of cell slots in a frame interval. A given device 5 can initiate multiple cell slot requests at different priority levels by indicating the number of cell slots required at each level.

Figure 4:
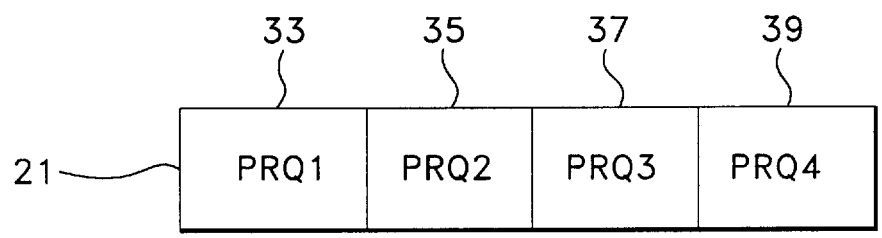
FIG. 4 depicts the format of an upstream request for one or more grants.

FIG. 4 depicts one possible format for cell slot request words. In this format, the cell slot request words are a sequence of 8 bits. The bits sequence is segmented into four fields of two bits each: PRQ1 33, PRQ2 35, PRQ3 37, and PRQ4 39.

Field PRQ1 33 represents the number of cell requests being made at the highest priority. A bit pattern of '00' indicates that no cell slots are being requested at the highest priority. A bit pattern of '01' indicates that one cell slot is being requested at the highest priority. A bit pattern of '10' indicates that two cell slots are being requested at the highest priority. A bit pattern of '11' indicates that three cell slots are being requested at the highest priority.

Field PRQ2 35 represents the number of cell requests being made at the next-to-highest priority. Likewise, field PRQ3 37 represents the number of cell requests being made at the next-to-lowest priority. Finally field PRQ4 39 represents the number of cell requests being made at the lowest priority.

It is believed that allowing for four levels of priority provides sufficient granularity to permit the BNU to optimally allocate cell slots among devices without undue complexity.

Each request slot optionally includes periodic data words 25. Periodic data words, typically zero to 36 in number, are words that are provisioned for the transport of time division multiplex (TDM) services, such as voice telephony and the like. During each frame interval these words are transferred from the associated device to the BNU. The frequency with which each data byte is transferred to the BTN 1 is 1/T. If T is made equal to 125 microseconds, the transfer frequency of each byte is 8 kHz, which is the frequency at which telephone signals are generally transported in the form of pulse code modulated bytes. Thus, use of a 125 microsecond frame interval is particularly suited to the transport of TDM data. However, other frame interval sizes may also be used. Frame intervals that are a multiple of 125 microseconds may prove to be particularly advantageous.

Cell Slots

Cell slots 13 are fixed in location and number relative to each frame interval 9. The cell slots are immediately adjacent in the frame interval, separated only by guard time 15. The last cell slot followed by a guard time terminates coincidentally with the frame interval 9. The start time of each cell slot 13 relative to the beginning of its frame interval 9 can thus be determined by consider the length T of the frame interval and the order of the cell slot among the set of adjacent cell slots within the frame interval. This provides a means of addressing each cell slot based upon its start time within the frame interval.

As shown in FIG. 3, a cell slot 15 comprises four fields: the preamble 17; device ID words 29; ATM cell 31; and FEC words 27. The preamble 17 and FEC words 27 serve the same function in a cell slot 15 as in a request slot 13.

The device ID words 29 are used to identify the particular device 5 to which the cell slot 13 is allocated. Unlike request slots 11, cell slots 13 are not fixedly allocated to a particular device. Instead, cell slots are allocated on a frame by frame basis to various devices 5 in response to downstream grant signals as determined by the BNU 1. A cell slot uses device ID words 29 to indicate the particular device with which the cell slot is associated. Each device 5 is identified by a device identifier, which is assigned to each device in the customer premises 7 when the device is initialized. The device identifier is placed in each cell slot allocated to a device.

ATM words 31 define a standard 53-byte ATM cell for asynchronous transfer mode transmission. The form and content of the ATM cell is well-known in the art.

The MAC Downstream Format

Figure 10:
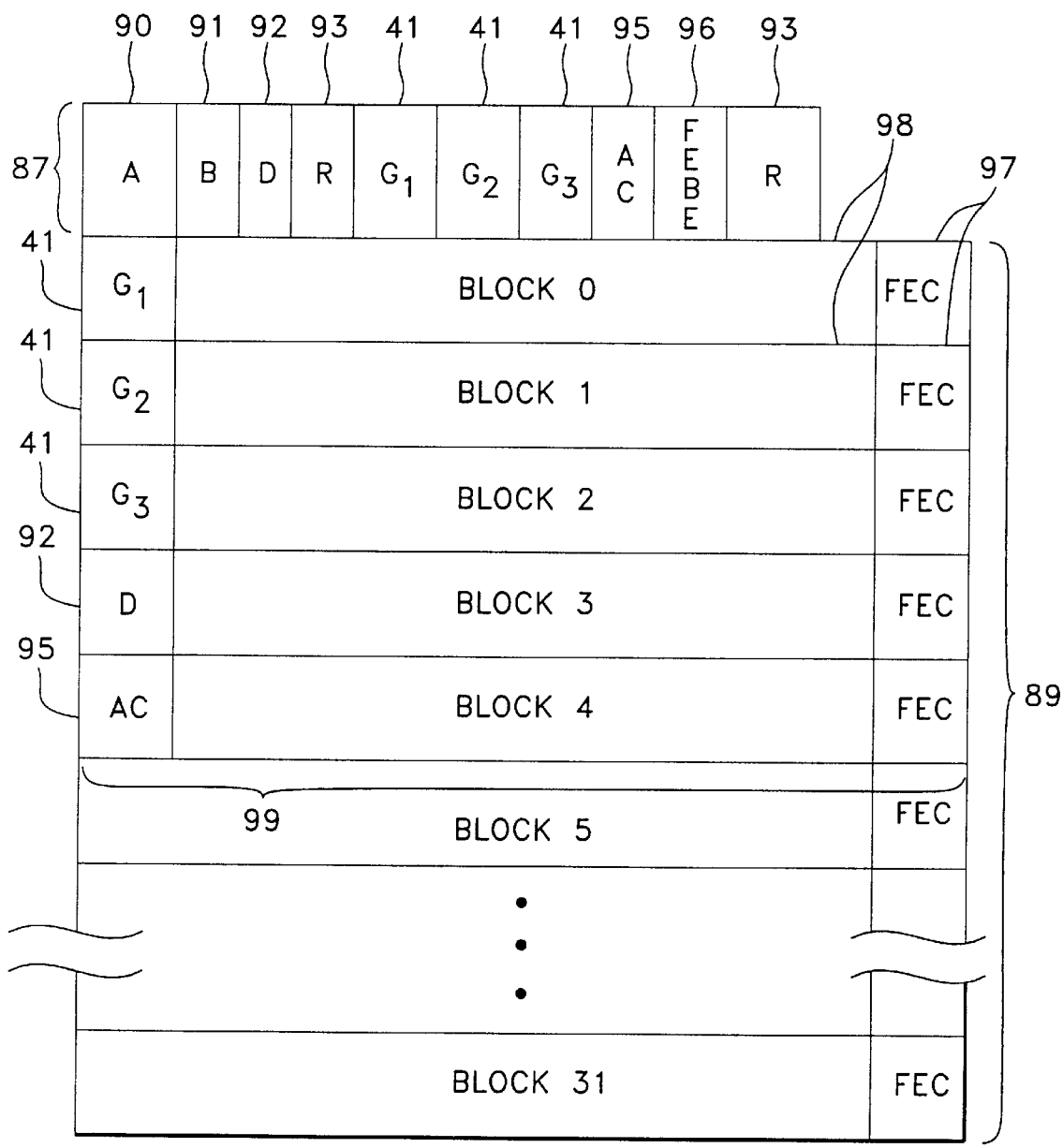
FIG. 10 depicts the format of a downstream signal.

FIG. 10 depicts an example of a downstream frame interval 94 suitable for use by the BNU. In general, the format of the MAC downstream transmission is not critical to the operation of the apparatus. The downstream transmission may be in any format that is suitable for transmission of large amounts of digitally addressable data, and, in particular, for the transmission of both ATM cells and periodic TDM data. In the example depicted in FIG. 10, downstream frame interval 94 comprises a downstream frame header 87 and a downstream payload 89. The downstream frame header 87 comprises framing word 90, modem balance word 91, datalink word 92, at least one grant word 41, alarm/control word 95, FEBE word 96 and reserved words 93. Reserved words 93 are not used and are generally set to zero. FEBE word 96 is used to provide error correction for the remainder of the downstream frame header 94. Framing word 90 is used by NIMs 6 to lock onto downstream data. Modem balance word 91, datalink word 92, and alarm/control word 95 are employed to control transmission circuitry and to control maintenance functions such as error handling, diagnostics, and datalink. In general, the details of the framing word, the modem balance word, the datalink word, the alarm/control word, and the FEBE word provide support for and are specific to the modulation scheme employed for downstream transport, and the transmission environment in which it must operate. The modulation scheme and transmission environment are not pertinent to the present invention and are not further described.

Downstream payload 89 comprises a series of payload segments 99. In one implementation, each payload segment is 99 is 29 bytes in length. A payload segment comprises a data block 98 and FEC 97. Data blocks 98, generally 25 bytes in length, contain data transmitted downstream to the addressed devices. FECs 97, generally 4 bytes in length, provide error correction for the immediately previous data block 98. Optionally, one or more payload segments 99 may include one or more words replicated from downstream frame header 87, such as grant word 41, datalink word 92, and alarm/control word 95, to provide redundancy for those words. Preferably, no more than five bytes are so replicated.

In order to synchronize with the upstream transmission, the downstream transmission should transmit using a frame interval having a size that is a multiple of the upstream frame interval size T. Complexity of implementation is reduced if this multiple is 1; that is, if the downstream frame interval and the upstream frame interval are of equal size.

In one implementation, the sum of the lengths of all downstream data blocks 98 is 795 bytes. This provides for a payload capacity sufficient to carry fifteen 53-byte data slots. Each of these 53-byte slots may be used to transport a 53-byte ATM cell. In such a case, the ATM cells are carried in the available payload bytes, one after the other. Alternatively, one or more of the 53-byte data slots may be used to carry periodic data. That is, a group of bytes in the payload that would normally be used to transport an ATM cell can instead be treated as 53 bytes for periodic data transport. If the downstream frame interval is 125 microseconds, each such byte will transfer period data at a frequency of 8 kHz. This is ideal for the transport of TDM periodic data, such as telephony data.

One requirement for the downstream signal is that it must be capable of transmitting a response to an upstream grant request to the devices 5. Such a response is referred to as an "upstream cell opportunity grant," or simply a "grant." Although grants may be transmitted in any of a number of ways, the use of a grant word in the downstream frame header is a convenient way of accomplishing this transmission. In such a scheme, one grant is transmitted in a grant word in the downstream frame interval for each cell slot position in the upstream frame interval 9. Each grant word corresponds to a predetermined cell slot; e.g., the first grant word describes a grant, if any, for the first cell slot position, the second grant word describes a grant, if any, for the second cell slot position, etc.

Figure 5:
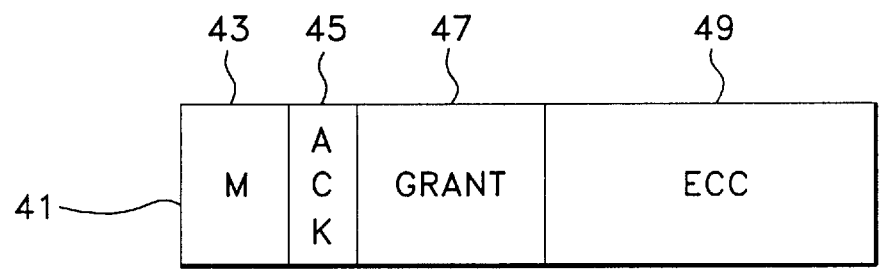
FIG. 5 depicts the format of a downstream grant.

FIG. 5 depicts one implementation of a grant word 41. In this implementation, the grant word occupies 16 bits. The grant comprises four fields: M-bits 43; ACK bit 45; grant bits 47; and ECC bits 49.

M-bits 43 comprise two bits that together indicate whether a request is being granted and, if so, the nature of the grant. An M-bit value of '11' indicates that a grant is being issued, and that the addressed device may use, in the next upstream frame interval, the cell slot corresponding to this grant word.

An M-bit value of '01' indicates that the corresponding cell slot may be used by any device for low-priority access. Because this grant is not directed to a specific device, the corresponding cell slot is subject to "collision"; that is, the cell slot may be used by multiple devices, resulting in data corruption. Any device using a cell slot in response to such a grant must be capable of tolerating data loss or be capable of retransmitting to avoid data loss. An M-bit value of '10' indicates that the corresponding cell slot may be used by any device for high-priority access; a value of '10' is otherwise equivalent to a value of '01'.

An M-bit value of '00' indicates that no grant is being issued. This value is used to ensure that an occasional cell slot is not to be used by any configured device. Such cell slots are therefore available to be used by devices being added to the network. A device 5 being connected may use such an unallocated cell slot during initialization to communicate to the BNU 1 to notify the BNU of its presence. The BNU then allocates a new request slot 11 in future upstream frame intervals 9 for use by the new device.

ACK bit 45 is a one-bit field. An ACK value of '1' indicates that the last upstream transmission using the cell slot to which this grant word corresponds was successful. An ACK value of '0' indicates that the last upstream transmission using the cell slot to which this grant word corresponds was not successful, e.g., because of a collision or other error.

GRANT field 47 is a four-bit field that identifies the device for which the cell slot is being granted. This field is meaningful only when M-bits 43 have a value of '11'. For example, a GRANT value of '0000' may be used to indicate that this grant is directed to device number 1; a value of '0001' that the grant is directed to device number 2, etc.

ECC field 49 is a 9-bit field that forms an error correction code to protect the other fields in the grant word.

It will be readily apparent that other formats of grant slots may be used without departing from the present invention. For example, GRANT field 47 may be more or fewer than 4 bits in width to accommodate more or fewer devices. In addition, for example, rather than using the position of a grant word 41 to indicate the cell slot 13 to which the grant refers, a cell slot identifier could be encoded within the grant. In addition, for example, the M-bit field may be omitted, and its function communicated by the use of a special-purpose device identifier that does not correspond to any configured device. In addition, for example, the grant words may include a priority indicator to facilitate communication with a device 5 that is capable of transmitting data at more than one priority.

Arbitration by the BNU

The BNU 1 makes all of the arbitration decisions to determine which cell slot requests which will be granted. The BNU may provide arbitration in a number of ways, depending on the characteristics of the greater distribution network, and on the expected patterns of upstream ATM cell traffic.

One example of an arbitration scheme is described as follows. In this arbitration scheme an assumption is made that there are two general types of cell traffic that will pass upstream: real-time streams and non-real-time streams. Real-time-streams include continuous bit rate (CBR) traffic such as MPEG video telephony traffic that is tolerant of detail loss, and variable bit rate (VBR) traffic such as MPEG video telephony traffic that is not tolerant of detail loss. Non-real-time streams include available bit rate (ABR) traffic such as file transfer. Real-time streams are not tolerant of delay and are therefore given a higher priority than non-real-time streams. Thus, there are two priorities: high for real-time streams, and low for non-real-time streams.

In the example arbitration scheme, the BNU 1 considers all of the requests made in a given upstream frame interval and determines how the X available cell slots are to be distributed among the competing requests. The BNU builds two ordered lists of grant requests, one list for high priority grant requests, and one list for low priority grant requests. Each list is sorted so that devices are considered in a round-robin fashion, with the device having obtained the most recent grant being considered last in each round-robin circuit.

The "Prioritize" Procedure

Table 1 is a pseudocode representation of a "prioritize" procedure to prepare such an ordered list:

TABLE 1 function prioritize(device_number, request_number, eligibility, valid, last_grant, reset)

```
1.   when (reset = 1):
2.     for (i = 1 to X) used[i] = 0
3.   when (valid = 1):
4.     if (request_number > eligibility)
           request_number = eligibility
5.     for (i = request_number to 1, decrement):
6.       request_boost = X - i
7.       if (device_number < last_grant)
           request_boost = request_boost + 1
8.       for (j = 1 to X):
9.         if (j = 1):
10.          in_used[j] = 1
11.          in_boost[j] = request_boost
12.          in_device[j] = device_number
13.        else:
14.          in_used[j] = out_used[j - 1]
15.          in_boost[j] = out_boost[j - 1]
16.          in_device[j] = out_device[j - 1]
17.          if (in_used[j] = 1 and ((used[j] = 0) or
               (in_boost[j] > boost[j])or
               ((in_boost[j] = boost[j] and
               (in_device[j] > device[j])))):
18.            out_used[j] = used[j]
19.            out_boost[j] = boost[j]
20.            out_device[j] = device[j]
21.            used[j] = in_used[j]
22.            boost[j] = in_boost[j]
23.            device[j] = in_device[j]
24.          else:
25.            out_used[j] = in_used[j]
26.            out_boost[j] = in_boost[j]
27.            out_device[j] = in_device[j]
28.  output(used[1 . . . X], device[1 . . . X])
```

The following parameters are taken as input to the "prioritize" procedure. The parameter "device_number" is the device identifier, having a value of 0 to N-1, where N is the number of devices in the configuration. The parameter "request_number" is the number of requests being made by the device, having a value of 0 to X, where X is again the number of cell slots in an upstream frame interval.

The parameter "eligibility" is a number that indicates the maximum number of cell slots that are to be allocated to the device, having a value of 0 to X. This parameter is provided by an external policing function that determines the number of cell requests that fall within a negotiated cell output rate for which the device is contracted. No policing is performed on low priority requests; that is, in the instantiation of this procedure to produce a low-priority ordered list, "eligibility" is always set to X.

The parameter "valid" indicates whether the parameters "device_number," "request_number," and "eligibility" are valid. A value of "1" indicates that the parameters are valid.

The parameter "last_grant" contains the device identifier of the last device to have been granted a cell slot for that priority level during the previous frame interval. The parameter "last_grant" has a value of 0 to N-1, where N is the number of devices in the configuration.

The parameter "reset" is asserted to begin a new round of prioritization.

The procedure analyzes all incoming cell slot requests of a given priority and selects X of them as candidates for granting. The X candidates are stored in X candidate records. A candidate record consists of a "used" bit that indicates whether the record describes a valid candidate, a "boost" value, and a device number. These three fields of each record are considered to determine whether a new candidate should be inserted into the ordered records with the existing lowest order candidate being pushed out. The insertion number is determined by comparing, in order of importance, the "used" bit, the "boost" value, and the device number.

Lines 1 and 2 of the procedure clear the candidate records. Line 3 begins an insertion determination when a valid request has arrived. Line 4 serves to limit the number of requests granted to a particular device to the value determined by the external policing function.

Line 5 begins performing calculations for each presented request made by each device. Lines 6 and 7 use the "boost" value to prioritize requests based upon the device number of the previously granted request and the number of requests being made. Lines 8–27 examine all ordered candidate records in the list to determine the appropriate insertion point and rippling records below the insertion point to the next lowest position, with the lowest order candidate being removed from the list. Line 28 outputs the completed ordered list.

The "Prioritize" Circuit

Figure 6:
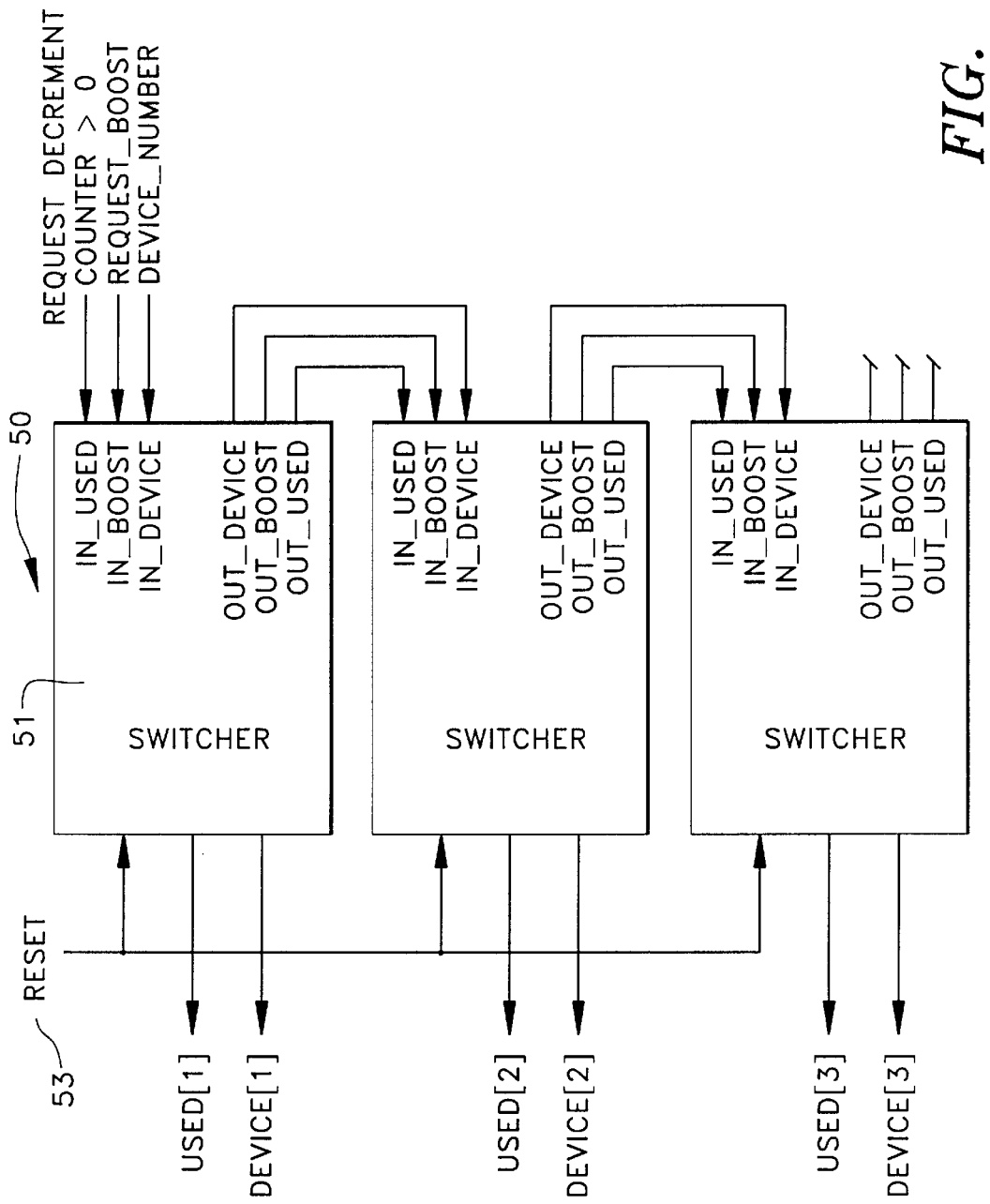
FIG. 6 is a block diagram of a logical circuit implementing a prioritization procedure.

The "prioritize" procedure can be readily implemented in dedicated hardware. FIG. 6 illustrates a circuit 50 to implement lines 8–27 of the "prioritize" function, where X is equal to 3. Each switcher 51 represents an instantiation of lines 8–27 of the procedure, rippling a candidate record to the immediately lower switcher.

Figure 7:
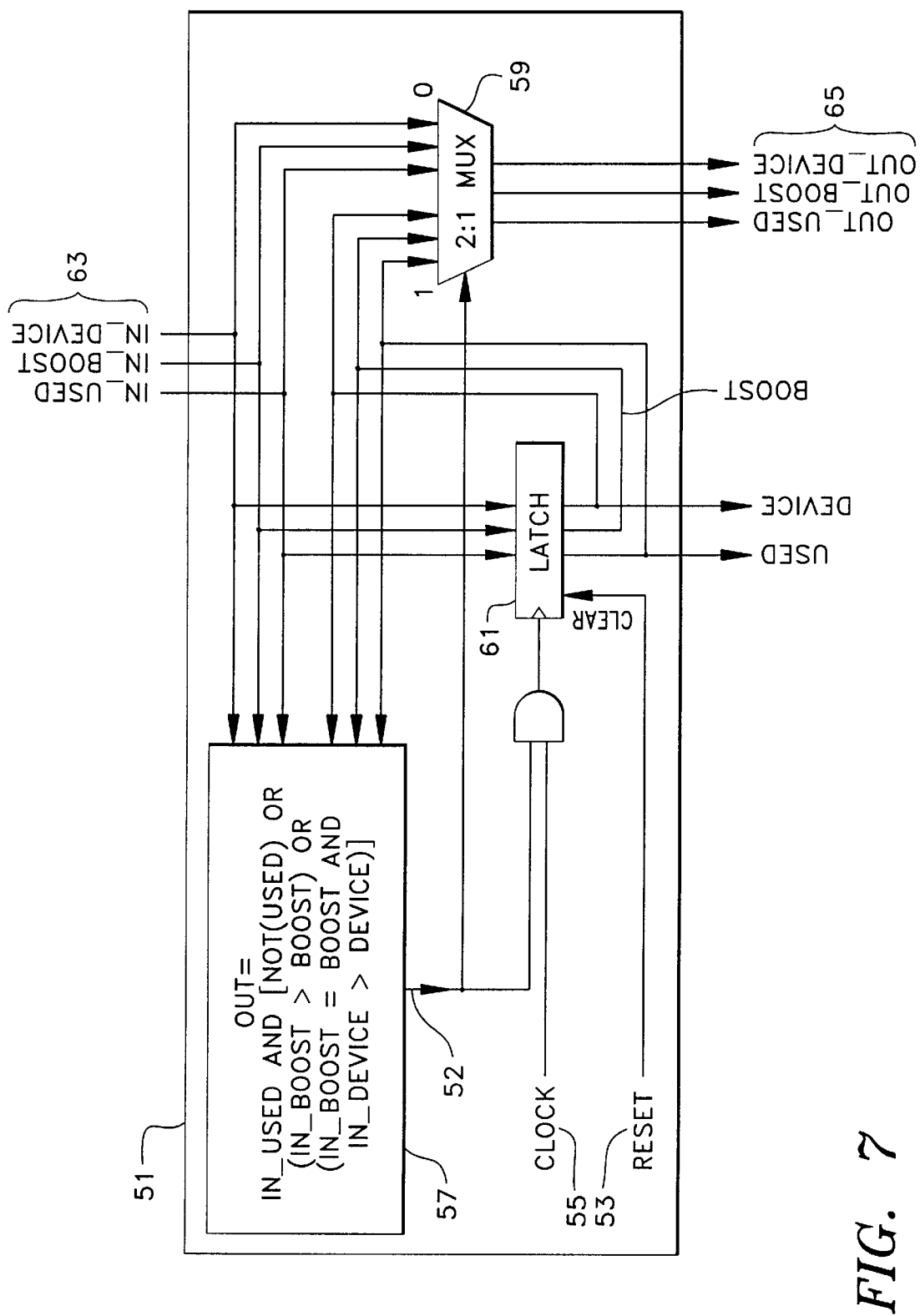
FIG. 7 depicts the logic circuit of FIG. 6 in greater detail.

FIG. 7 depicts a detailed view of the switcher 51. Logic block 57 takes as input a candidate record stored in latch 61 and the input values "in_used", "in_boost" and "in_device", and generates a truth value signal 52 having a value of 1 (true) or 0 (false) according to the conditional statement represented by line 17 of the "prioritize" procedure. The truth value signal controls 2:1 multiplexor 59 and latch 61. If the conditional evaluates as false, yielding a truth value signal of 0, multiplexor 59 passes the input record values 63 out unchanged as output record values 65. If the condition evaluates as true, yielding a truth value signal of 1, multiplexor 59 produces output values 65, which correspond to the existing candidate record stored in latch 61. Simultaneously, the candidate record in latch 61 is replaced by the input 63. As shown in FIG. 6, each switcher output, other than the last, is cascaded to the next lower switcher input, so that all switchers, taken as a group, produce as output a set of signals that represent the X candidates selected for grant requests that make up the particular ordered list of candidates.

The "Grant" Procedure

After the ordered lists are created, the lists are used as input to a "grant" procedure that selects the candidates to be granted from the lists. Table 2 is a pseudocode representation of a "grant" procedure to perform such selection:

TABLE 2 function grant(used$_{high}$[1 . . . X], device$_{high}$[1 . . . X], space$_{high}$, used$_{low}$[1 . . . X], device$_{low}$[1 . . . X], space$_{low}$)

```
1.  for (j = 1 to X):
2.    empty[j] = 1
3.    if (used_high[j] = 1 and j ≤ space_high):
4.      grant[j] = device_high[j]
5.      priority[] = 1
6.      empty[j] = 0
7.    else if (used_low[X - j + 1] = 1 and
              (X - j + 1) ≤ space_low):
8.      grant[j] = device_low[X - j + 1]
9.      priority[j] = 0
10.     empty[j] = 0
11.   if (used_high[1] = 1 and 1 ≤ space_high):
12.     last_grant_high = device_high[1]
13.   for (j = 1 to X):
14.     if (empty[j] = 0 and priority[j] = 0 and
            (j = 1 or empty[j - 1] = 1 or priority[j - 1] = 1):
15.       last_grant_low = device_low[X - j + 1]
16.   output(empty[1 . . . X], priority[1 . . . X],
          grant[1 . . . X], last_grant_high, last_grant_low)
```

The "grant" procedure uses the output of two instantiations of the "prioritize" function to generate cell slot grants. One instantiation of the "prioritize" function is used to develop an ordered record of high priority cell slot candidates, the other for low priority cell slot candidates. This procedure considers these two sets of records and makes cell slot grant decisions based on the record contents and on the space available in the two upstream cell buffers (high and low priority).

The following parameters are taken as input to the "grant" procedure. The parameter "used$_{high}$[1. . . X]" is an array of X binary values, one binary value for each of X candidate records produced as output by the application of the "prioritize" function of Table 1 on high priority grant requests. A value of 1 indicates that the candidate record is valid; a value of 0 indicates that the candidate record is not valid.

The parameter "device$_{high}$[1. . . X]" is an array of X values, one value for each of X candidate records produced as output by the application of the "prioritize" function of Table 1 on high priority grant requests. Each array element has value in the range of 0 to N-1, and represents the device identifier of the device making the request.

The parameter "space$_{high}$" represents the number of cells that can be absorbed by an upstream buffer for high priority cells. This number is dependent, in part, on the buffer size selected by the implementation.

The parameter "used$_{low}$[1. . . X]" is an array of X binary values, one binary value for each of X candidate records produced as output by the application of the "prioritize" function of Table 1 on low priority grant requests. A value of 1 indicates that the candidate record is valid; a value of 0 indicates that the candidate record is not valid.

The parameter "device$_{low}$[1. . . X]" is an array of X values, one value for each of X candidate records produced as output by the application of the "prioritize" function of Table 1 on low priority grant requests. Each array element has value in the range of 0 to N-1, and represents the device identifier of the device making the request.

The parameter "space$_{low}$" represents the number of cells that can be absorbed by an upstream buffer for low priority cells. This number is dependent, in part, on the buffer size selected by the implementation.

Lines 1–10 of the procedure select X cell slot requests to grant. Line 2–10 are executed for each grant, as indexed by Line 1. Line 2 marks the cell slot as unallocated so that, if no candidate request is found for that cell slot, it remains unallocated. Lines 3–6 select a high priority request, if one is eligible. If no high priority requests are eligible, Lines 7–10 select a low priority request. If neither a high priority request nor a low priority request is eligible, the cell slot remains unallocated as set in Line 2.

Lines 11–12 set the variable "last_grant$_{high}$" to the device identifier of the last device to be granted a high priority cell slot. This variable will be used by the next invocation of the "prioritize" function for the high priority cell requests so that the devices other than the last device selected is preferred in the next invocation of the procedure. Lines 13–15 perform a comparable function for the low priority cell requests.

Line 16 produces output indicating the BNU's decisions for cell allocation.

The "Grant" Circuit

Figure 8:
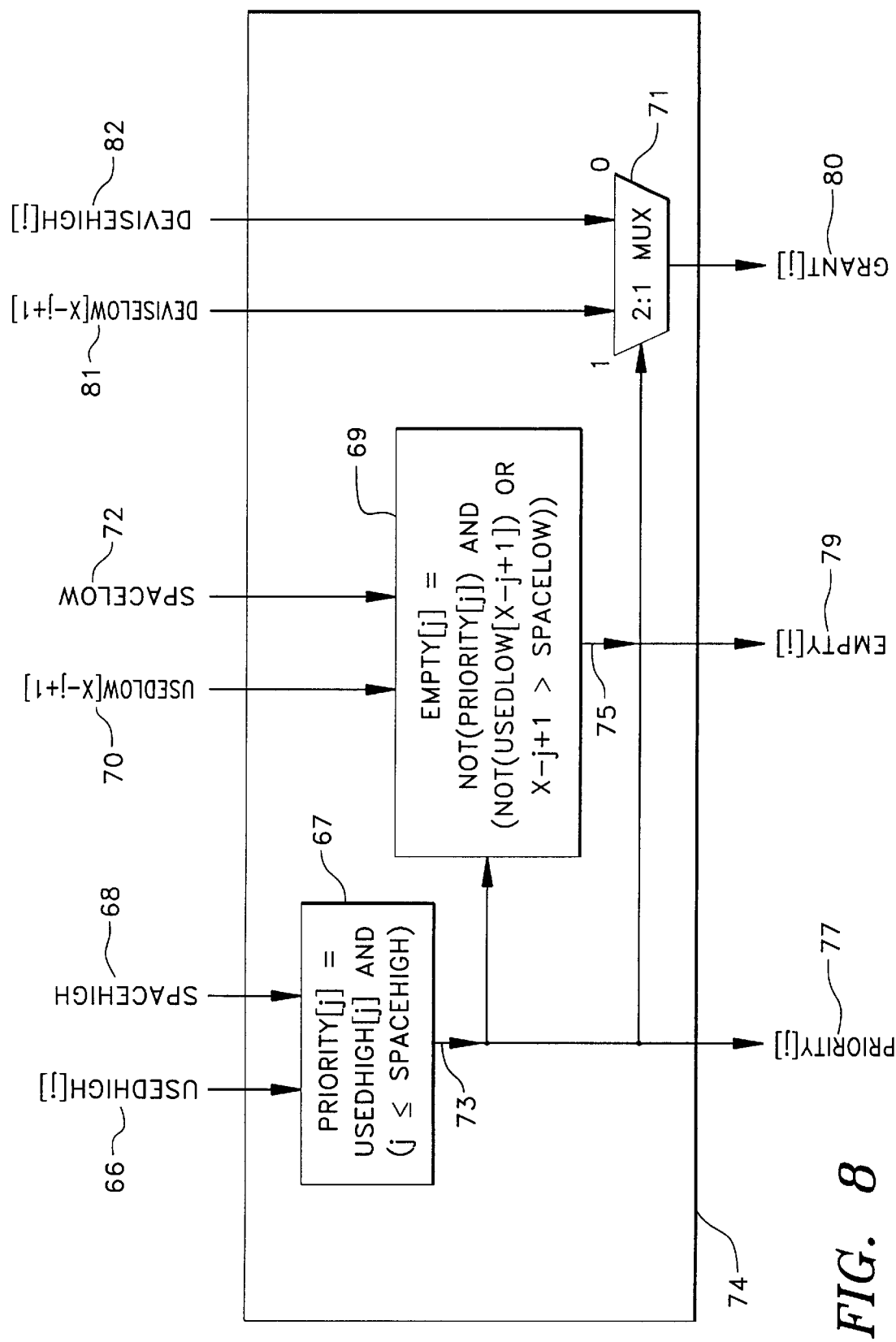
FIG. 8 depicts a logic circuit to select a single grant request.

The "grant" procedure can be readily implemented in dedicated hardware. FIG. 8 illustrates a circuit 74 implementing an instantiation of lines 3–10 of the "grant" function, where X is equal to 3. Logic block 67 performs the function of lines 3–6, to select a high priority request, if any, for output. Logic block 67 takes as input a particular "used$_{high}$" array element 66 and the "space$_{high}$" parameter 68 and generates a truth value signal 73 having a value of 1 (true) or 0 (false) according to the conditional statement represented by line 3 of the "grant" procedure. The truth value signal 73 is produced as output in the form of the "priority[j]" signal 77, and also serves as input to logic block 69 and multiplexor 71.

Logic block 69 performs the function of lines 7–10, to select a low priority request, if any, for output. Logic block 69 takes as input a particular "used$_{low}$" array element 70, the "space$_{low}$" parameter 72, and truth value signal 73. Logic block 69 generates a truth value signal 75 having a value of 1 (true) or 0 (false) according to the conditional statement represented by line 7 of the "grant" procedure, ANDed with the truth signal 73 from logic block 67. The resulting truth value signal 75 thus represents a 1 if neither a high priority request nor a low priority request is selected to be granted. The truth value signal 75 is produced as output in the form of the "empty[j]" signal 79.

A 2:1 multiplexor 71 takes as input a particular "device$_{low}$" array element 81 and a particular "device$_{high}$" array element 82. Multiplexor 71 is modulated by truth value signal 73 to select between the two array elements and produce grant signal 80.

Figure 9:
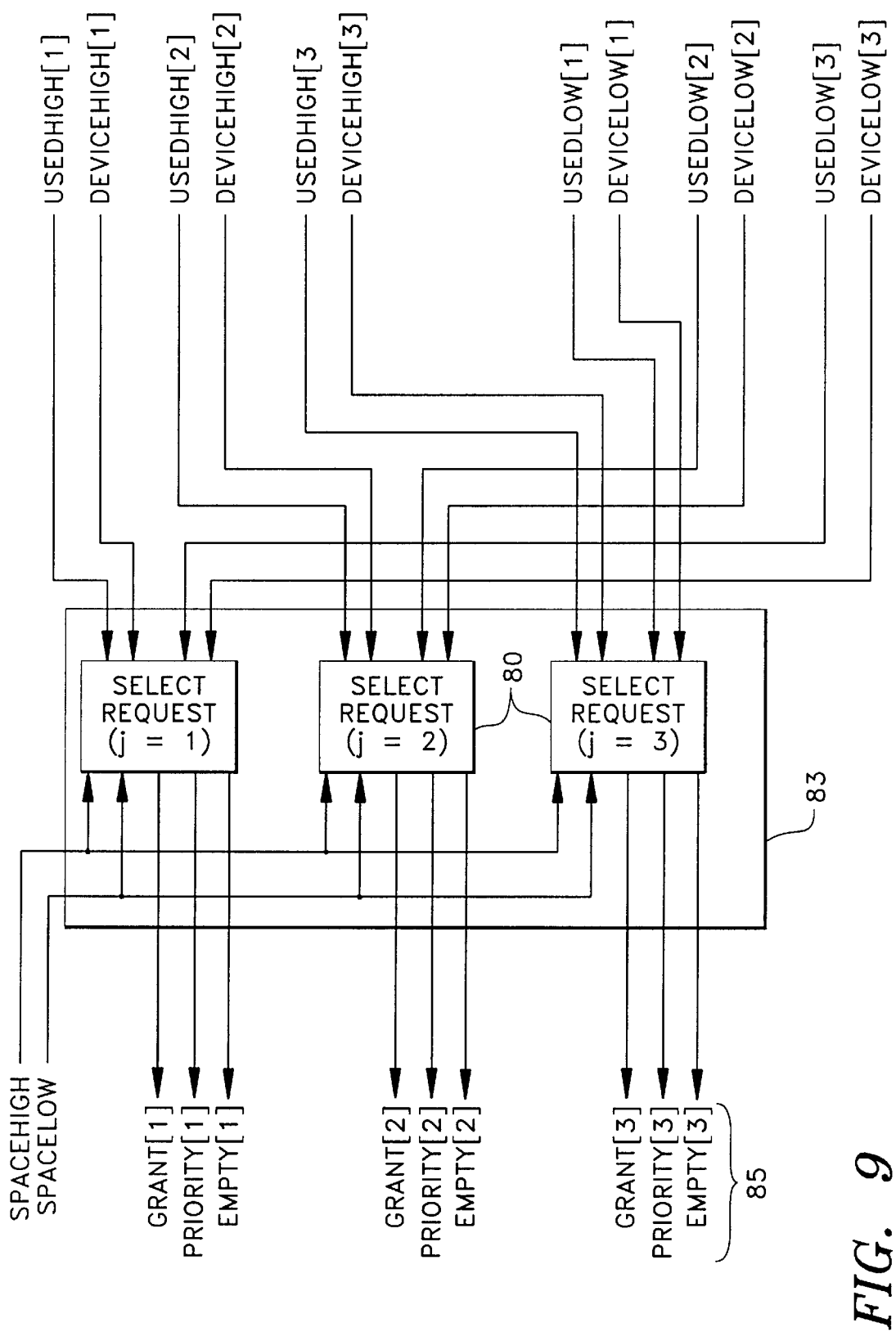
FIG. 9 is a block diagram of a logic circuit employing multiple instantiations of the logic circuit of FIG. 8.

FIG. 9 depicts a three-way circuit 83 comprising three grant circuits 80 to produce a set of three request grants 85 for use in an implementation where X is equal to 3.

Effect of Denial of a Request

During both rounds of arbitration cell slots can be denied to a device if it has been transmitting cells at a faster rate than it contracted for with the distribution system, or if there is no buffer or transmission space available to carry cells of that priority further upstream.

If a request is refused it is discarded. The requesting device then has the option of making the same request in future frame intervals until it is granted. Alternatively, a more elaborate version of this arbitration example could queue up requests in the order they arrive in high and low priority queues. These requests could then be attended to as cell slots become available.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A system for bidirectional transport of digital services between a digital network and at least one network interface module, said system comprising:

a broadband digital terminal attached to the network and capable of transferring data to and from the network;

a broadband network unit attached to the broadband digital terminal and capable of transferring data to and from the broadband digital terminal, said broadband network unit comprising:

means for accepting an upstream signal including a plurality of frame intervals, each frame interval configured to contain a plurality of request slots and a cell slot, with each network interface module being representable in at least one request slot and each request slot being capable of indicating a request for a cell slot without prior authorization from the broadband network for such a request;

means for decoding the request;

means for determining whether to grant the request;

means for providing a downstream signal capable of indicating to the broadband digital terminal that the request is granted; and means for transferring data in response to the downstream signal.

2. The system of claim 1, wherein each frame interval has a width that is a multiple of 125 microseconds.

3. The system of claim 1, wherein said multiple is 1.

4. The system of claim 1, wherein each cell slot contains an ATM cell.

5. The system of claim 1, wherein each request slot contains an indicator of a request for allocation of a cell slot.

6. The system of claim 1, wherein each request slot contains periodic data.

7. The system of claim 6, wherein said periodic data is Time Division Multiplex data.

8. The system of claim 1, wherein each request slot contains: an indicator of a request for allocation of a cell slot; and periodic data.

9. The system of claim 8, wherein said periodic data is Time Division Multiplex data.

10. The system of claim 1, wherein said means for determining whether to grant the request operates on a first set of ordered records and a second set of ordered records.

11. In a bidirectional data transport system having a broadband digital terminal connected to a broadband digital network unit via a fiber optic connection, network interface devices and a shared media, wherein said network interface devices are connected to said broadband digital network unit via said shared media, and downstream and upstream frame intervals on said shared media containing at least one cell slot, wherein said downstream and upstream frame intervals have a fixed temporal relationship, a method for granting access to upstream cell slots within said upstream frame intervals comprising:

transmitting a request for upstream data transport from one of said network interface devices over said shared media in a pre-allocated time slot in an upstream frame interval;

receiving said request for upstream data transport at said broadband digital network unit;

issuing a flow of grants in said downstream frame intervals wherein each of said grants controls use of an upstream cell slot by one of said network interface devices in a subsequent frame interval; and transferring data to said broadband digital network unit in response to said grants.

12. The method of claim 11, wherein said method for granting access to upstream cell slots within said upstream frame intervals further comprises:

encoding grants for transmission access to said upstream cell slots, wherein said grants represent the type of access to said upstream cell slots; and wherein each grant corresponds to a predetermined upstream cell slot in a subsequent upstream frame interval.

13. The method of claim 12, wherein said encoding comprises the use of a grant field which contains a device identifier.

14. The method of claim 12, wherein said grant field is a 4 bit grant field.

15. The method of claim 12, wherein said encoding comprises the use of 4 bit grant field such that, when said 4 bit grant field is equal to said device identifier, access to said predetermined upstream cell is granted to said device corresponding to said device identifier.

16. The method of claim 12, wherein said encoding comprises the use of a 4 bit grant field such that, when said 4 bit grant field is equal to a special-purpose device identifier which does not correspond to a device, access to said predetermined upstream cell is denied.

17. The method of claim 12, wherein said encoding comprises the use of a M-bit field which contains at least one bit indicating if said grant allows access to said predetermined upstream cell.

18. The method of claim 17, wherein said encoding comprises the use of a M-bit field which contains two bits and a value of '11' in said M-bit field indicates access to said predetermined upstream cell is being issued.

19. The method of claim 17, wherein said encoding includes a M-bit field which contains two bits and a value of '01' in said M-bit field indicates that access to said predetermined upstream cell is being issued to any device requiring low priority contention access.

20. The method of claim 17, wherein said encoding includes a M-bit field which contains two bits wherein a value of '10' in said M-bit field indicates that access to said predetermined upstream cell is being issued to any device requiring high priority contention access.

21. The method of claim 17, wherein said encoding includes a M-bit field which contains two bits wherein a value of '00' in said M-bit field indicates that access to said predetermined upstream cell is not being issued.

22. The method of claim 11, wherein said method for granting access to upstream cell slots within said upstream frame intervals comprises:

encoding grants for transmission access to said upstream cell slot wherein said grants represent the type of access to said upstream cell slots;

issuing grants in said downstream frame intervals wherein each grant corresponds to a predetermined upstream cell slot in a subsequent upstream frame interval;

transmitting information from one of said devices in said predetermined upstream cell slot;

receiving said information transmitted in said upstream cell slot; and acknowledging successful reception of said information transmitted in said upstream cell slot in an acknowledgment field contained within a subsequent grant.

23. The method of claim 22, wherein said acknowledgment field is a one bit field.

24. The method of claim 23, wherein said acknowledgment field is a one bit field wherein a value of '1' in said acknowledgment field represents successful reception and a value of '0' in said acknowledgment field represents unsuccessful reception.

25. The method of claim 23, wherein said acknowledgment field is a one bit field wherein a value of '0' in said acknowledgment field represents successful reception and a value of '1' in said acknowledgment field represents unsuccessful-reception.

26. The method of claim 11, wherein each grant corresponds to a predetermined upstream cell slot in a subsequent upstream frame interval.

27. The method of claim 26, wherein said request comprises the use of a priority field which indicates a priority level and the number of said upstream cell slots being requested at said priority level.

28. The method of claim 27, wherein said request has four priority fields, and each of said priority fields represents a distinct priority level and indicates the number of said upstream cell slots being requested at said distinct priority level.

29. The method of claim 28, wherein each of said priority fields are two bits.

30. A bidirectional fiber-to-the-curb transport system for the transport of digital data comprising:

a broadband digital terminal connected to a broadband digital network unit via a fiber optic connection;

a shared media;

network interface devices connected to said broadband digital network unit via said shared media;

downstream and upstream frame intervals on said shared media containing at least one cell slot, wherein said downstream and upstream frame intervals have a fixed temporal relationship;

means for transmitting a request for upstream data transport from one of said network interface devices over said shared media in a pre-allocated time slot in an upstream frame interval;

means for receiving said request for upstream data transport at said broadband digital network unit;

means for granting access to upstream cell slots within said upstream frame intervals by issuing grants in said downstream frame intervals, wherein each of said grants controls use of an upstream cell slot by one of said network interface devices in a subsequent upstream frame interval.

31. The system of claim 30, wherein said system for the transport of digital data further comprises:

means for encoding grants for transmission access to said upstream cell slots wherein said grants represent the type of access to said upstream cell slots; and wherein each grant corresponds to a predetermined upstream cell slot in a subsequent upstream frame interval.

32. The system of claim 31, wherein said encoding comprises the use of a grant field which contains a device identifier.

33. The system of claim 31, wherein said grant field is a 4 bit grant field.

34. The system of claim 31, wherein said encoding comprises the use of 4 bit grant field such that, when said 4 bit grant field is equal to said device identifier, access to said predetermined upstream cell is granted to said device corresponding to said device identifier.

35. The system of claim 31, wherein said encoding comprises the use of a 4 bit grant field such that, when said 4 bit grant field is equal to a special-purpose device identifier which does not correspond to a device, access to said predetermined upstream cell is denied.

36. The system of claim 31, wherein said encoding comprises the use of a M-bit field which contains at least one bit indicating if said grant allows access to said predetermined upstream cell.

37. The system of claim 36, wherein said encoding comprises the use of a M-bit field which contains two bits and a value of '11' in said M-bit field indicates access to said predetermined upstream cell is being issued.

38. The system of claim 36, wherein said encoding includes a M-bit field which contains two bits and a value of '01' in said M-bit field indicates that access to said predetermined upstream cell is being issued to any device requiring low priority contention access.

39. The system of claim 36, wherein said encoding includes a M-bit field which contains two bits wherein a value of '10' in said M-bit field indicates that access to said predetermined upstream cell is being issued to any device requiring high priority contention access.

40. The system of claim 36, wherein said encoding includes a M-bit field which contains two bits wherein a value of '00' in said M-bit field indicates that access to said predetermined upstream cell is not being issued.

41. In a bidirectional fiber-to-the-curb transport system having a shared media, devices connected to said shared media, downstream and upstream frame intervals containing at least one cell slot, wherein said upstream and downstream frame intervals have a fixed temporal relationship, a system for granting access to upstream cell slots within said upstream frame intervals characterized by issuing grants in said downstream frame intervals wherein each of said grants controls use of a predetermined upstream cell slot by one of said devices in a subsequent upstream frame interval, said system comprising:

means for encoding grants for transmission access to said upstream cell slot wherein said grants represent the type of access to said upstream cell slots;

means for issuing grants in said downstream frame intervals wherein each grant corresponds to a predetermined upstream cell slot in a subsequent upstream frame interval;

means for transmitting information from one of said devices in said predetermined upstream cell slot;

means for receiving said information transmitted in said upstream cell slot; and means for acknowledging successful reception of said information transmitted in said upstream cell slot in an acknowledgement field contained within a subsequent grant.

42. The system of claim 41, wherein said acknowledgment field is a one bit field.

43. The system of claim 42, wherein said acknowledgment field is a one bit field wherein a value of '1' in said acknowledgment field represents successful reception and a value of '0' in said acknowledgment field represents unsuccessful reception.

44. The system of claim 42, wherein said acknowledgment field is a one bit field wherein a value of '0' in said acknowledgment field represents successful reception and a value of '1' in said acknowledgment field represents unsuccessful reception.

45. The method of claim 30, wherein each grant corresponds to a predetermined upstream cell slot in a subsequent upstream frame interval.

46. The system of claim 45, wherein said request comprises the use of a priority field which indicates a priority level and the number of said upstream cell slots being requested at said priority level.

47. The system of claim 46, wherein said request has four priority fields, and each of said priority fields represents a distinct priority level and indicates the number of said upstream cell slots being requested at said distinct priority level.

48. The system of claim 47, wherein each of said priority fields are two bits.

* * * * *

UNITED STATES PATENT AND TRADEMARK OFFICE
CERTIFICATE OF CORRECTION

PATENT NO. : 5,850,400
DATED : December 15, 1998
INVENTOR(S) : Thomas R. Eames; Kenneth M. Buckland; Lac X. Trinh; and Steven D. Warwick.

It is certified that error appears in the above-identified patent and that said Letters Patent is hereby corrected as shown below:

Col. 3, line 39 change "device 3" to --device 5--; Col. 5, line 2 change "BTN 1" to --BNU 1--; Col. 5, line 24 change "cell slot 15" to --cell slot 13--; Col. 6, line 8 delete "is" first occurrence; Col. 12, line 36, change "1" first occurrence to --2--; Col. 13, line 21 change "12" to --11--; and Col. 16, line 28, change "method" to --system--.

Signed and Sealed this

Thirtieth Day of January, 2001

Attest:

Q. TODD DICKINSON

*Attesting Officer*  *Director of Patents and Trademarks*